US012398260B2

(12) United States Patent
Ferraro et al.

(10) Patent No.: US 12,398,260 B2
(45) Date of Patent: Aug. 26, 2025

(54) POLYPROPYLENE COMPOSITION

(71) Applicant: Basell Poliolefine Italia S.r.l., Milan (IT)

(72) Inventors: Gianpiero Ferraro, Ferrara (IT); Claudio Cavalieri, Ferrara (IT); Caroline Cathelin, Ferrara (IT); Eleonora Ciaccia, Ferrara (IT); Marco Ciarafoni, Ferrara (IT); Ambra Montaletti, Ferrara (IT); Alberta De Capua, Ferrara (IT); Roberto Pantaleoni, Ferrara (IT); Tiziana Caputo, Ferrara (IT); Giansiro Prini, Ferrara (IT); Alberto Nardin, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 489 days.

(21) Appl. No.: 18/010,421

(22) PCT Filed: Jun. 1, 2021

(86) PCT No.: PCT/EP2021/064705
§ 371 (c)(1),
(2) Date: Dec. 14, 2022

(87) PCT Pub. No.: WO2022/002514
PCT Pub. Date: Jan. 6, 2022

(65) Prior Publication Data
US 2023/0312897 A1    Oct. 5, 2023

(30) Foreign Application Priority Data
Jun. 30, 2020    (EP) .................... 20183010

(51) Int. Cl.
*C08L 23/16*    (2006.01)
*C08L 23/14*    (2006.01)

(52) U.S. Cl.
CPC ............ *C08L 23/142* (2013.01); *C08L 23/16* (2013.01); *C08L 2203/14* (2013.01); *C08L 2205/025* (2013.01); *C08L 2314/02* (2013.01)

(58) Field of Classification Search
CPC .... C08L 23/142; C08L 23/16; C08L 2203/14; C08L 2205/025; C08L 2314/02; C08L 2308/00

See application file for complete search history.

(56) References Cited

U.S. PATENT DOCUMENTS

| 4,298,718 | A | 11/1981 | Mayr et al. |
| 4,495,338 | A | 1/1985 | Mayr et al. |
| 2008/0132645 | A1 | 6/2008 | Muyldermans et al. |
| 2009/0030098 | A1 | 1/2009 | Cagnani et al. |
| 2011/0245427 | A1 | 10/2011 | Cavalieri et al. |
| 2011/0288213 | A1 | 11/2011 | Bergstra et al. |
| 2013/0095266 | A1 | 4/2013 | Galvan et al. |

FOREIGN PATENT DOCUMENTS

| BR | 112019024973 | A2 | 6/2020 | |
| CN | 101087851 | A | 12/2007 | |
| CN | 101115797 | A | 1/2008 | |
| CN | 101213249 | A | 7/2008 | |
| CN | 102264527 | A | 11/2011 | |
| CN | 102985479 | A | 3/2013 | |
| CN | 104520374 | A | 4/2015 | |
| CN | 109790344 | A | 5/2019 | |
| EP | 45977 | A2 | 2/1982 | |
| EP | 361494 | A2 | 4/1990 | |
| EP | 728769 | A1 | 8/1996 | |
| EP | 782587 | A1 | 7/1997 | |
| EP | 1272533 | A1 | 1/2003 | |
| EP | 1674530 | A1 * | 6/2006 | ............ C08L 67/025 |
| EP | 1899415 | A1 | 3/2008 | |
| JP | 2008545054 | A | 12/2008 | |
| JP | 2011506717 | A | 3/2011 | |
| JP | 2013173924 | A | 9/2013 | |
| JP | 2017509753 | A | 4/2017 | |
| JP | 2018188504 | A | 11/2018 | |
| JP | 2020041038 | A | 3/2020 | |
| KR | 20080023304 | A | 3/2008 | |
| KR | 20180066195 | A | 6/2018 | |
| KR | 20190132701 | A | 11/2019 | |
| KR | 20200030118 | A | 3/2020 | |
| WO | 0002929 | A1 | 1/2000 | |
| WO | 0016361 | A1 | 3/2000 | |
| WO | WO-2007003523 | A1 * | 1/2007 | ................ C08J 9/14 |
| WO | WO-2010072841 | A1 * | 7/2010 | ............ C08L 23/14 |
| WO | 2020126516 | A1 | 6/2020 | |

OTHER PUBLICATIONS

The International Search Report and the Written Opinion for PCT/EP2021/064705 mailed Aug. 26, 2021.

* cited by examiner

*Primary Examiner* — Kumar R Bhushan

(57) ABSTRACT

A polypropylene composition made from or containing:
from 70 wt % to 90 wt % of a propylene 1-hexene copolymer containing from 1.0 wt % to 5.0 wt % of 1-hexene derived units and a polydispersity index (PI) between 9.2 and 21.3; and
from 10 wt % to 30 wt % of a copolymer of propylene and ethylene containing from 45.0 wt % to 65.0 wt % of ethylene derived units;
the sum A)+B) being 100.

15 Claims, No Drawings

POLYPROPYLENE COMPOSITION

This application is the U.S. National Phase of PCT International Application PCT/EP2021/064705, filed Jun. 1, 2021, claiming benefit of priority to European Patent Application No. 20183010.6, filed Jun. 30, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to polypropylene composition containing 1-hexene derived units.

BACKGROUND OF THE INVENTION

In some instances, the processability in the molten state of propylene homo- and copolymers is influenced by the molecular weight and the molecular weight distribution (MWD). In some instances, molecular weight is expressed in terms of melt flow rates (MFR). In some instances, molecular weight distribution is expressed as the ratio of the weight average molecular weight Mw to the number average molecular weight Mn or as the Polydispersity Index (P.I.).

As molecular weight distribution broadens or Polydispersity Index increases, propylene polymers have a lower melt viscosity than polymers having a narrower molecular weight distribution. As a result, the propylene polymers having a broader MWD flows more readily in thermoforming, injection molding, blow molding, or stretch blow molding, coating, and film conversion than polymers having a narrower MWD.

In some instances and for certain applications, such as polymer foams, products having a combination of flowability and melt strength are useful.

SUMMARY OF THE INVENTION

In a general embodiment, the present disclosure provides a polypropylene composition made from or containing:
A) from 70 wt % to 90 wt % of a propylene 1-hexene copolymer containing from 0.5 wt % to 3.5 wt % of 1-hexene derived units, based upon the total weight of the propylene 1-hexene copolymer, having:
fraction soluble in xylene at 25° C. between 2.5 wt % and 8.0 wt %, based upon the total weight of the propylene 1-hexene copolymer;
melt flow rate (MFR L according to ISO 1133, condition L, that is, 230° C. and 2.16 kg load) ranging from 2.0 to 15.0 g/10 min; and
a polydispersity index (PI) between 9.2 and 21.3; and
B) from 10 wt % to 30 wt % of a copolymer of propylene and ethylene containing from 45.0 wt % to 65.0 wt % of ethylene derived units, based upon the total weight of the copolymer of propylene and ethylene;
wherein, in the polypropylene composition,
the xylene soluble fraction at 25° C. ranges from 10.0 wt % to 25.0 wt %, based upon the total weight of the polypropylene composition;
the intrinsic viscosity of the fraction soluble in xylene at 25° C. ranges from 4.0 dl/g to 6.5 dl/g;
the content of ethylene derived units in the fraction soluble in xylene at 25° C. is lower than the content of ethylene derived units of component B) and ranges from 38.0 wt % to 55.0 wt %, based upon the total weight of the polypropylene composition, and
the distribution of molecular weight Mw/Mn ranges from 25 to 40;
the sum of component A) and B) being 100.

DETAILED DESCRIPTION OF THE INVENTION

In some embodiment, the present disclosure provides a polypropylene composition made from or containing:
A) from 70 wt % to 90 wt %, alternatively from 74 wt % to 86 wt %, alternatively from 77 wt % to 82 wt %, of a propylene 1-hexene copolymer containing from 0.5 wt % to 3.5 wt %; alternatively from 1.0 wt % to 2.9 wt %; alternatively from 1.2 wt % to 2.4 wt %; of 1-hexene derived units, based upon the total weight of the propylene 1-hexene copolymer, having:
fraction soluble in xylene at 25° C. between 2.5 wt % and 8.0 wt %; alternatively between 3.1 wt % and 6.8 wt %; alternatively between 3.8 wt % and 5.9 wt %, based upon the total weight of the propylene 1-hexene copolymer;
melt flow rate (MFR L according to ISO 1133, condition L, that is, 230° C. and 2.16 kg load) ranging from 2.0 to 15.0 g/10 min; alternatively ranging from 3.0 to 10.0 g/10 min; and
a polydispersity index (PI) between 9.2 and 21.3; alternatively between 10.1 and 16.4; alternatively between 11.3 and 14.2; and
B) from 10 wt % to 30 wt %, alternatively from 14 wt % to 26 wt % alternatively from 18 wt % 23 wt %, of a copolymer of propylene and ethylene containing from 45.0 wt % to 65.0 wt %, alternatively from 48.0 wt % to 61.0 wt %, alternatively from 50.0 wt % to 59.0 wt %, of ethylene derived units, based upon the total weight of the copolymer of propylene and ethylene;
wherein, in the polypropylene composition,
the xylene soluble fraction at 25° C. ranges from 10.0 wt % to 25.0 wt %; alternatively from 16.0 wt % to 22.0 wt %, based upon the total weight of the polypropylene composition;
the intrinsic viscosity of the fraction soluble in xylene at 25° C. ranges from 4.0 dl/g to 6.5 dl/g; alternatively from 4.1 dl/g to 6.3 dl/g; alternatively 5.3 dl/g to 6.2 dl/g;
the content of ethylene derived units in the fraction soluble in xylene at 25° C. is equal to or lower than the content of ethylene derived units of component B) and ranges from 38.0 wt % to 55.0 wt %; alternatively from 41.0 wt % to 52.0 wt %, alternatively from 43.0 wt % to 51.0 wt %, based upon the total weight of the polypropylene composition; and
the distribution of molecular weight Mw/Mn ranges from 25 to 40; alternatively from 28 to 38; alternatively from 30 to 35;
the sum of component A) and B) being 100.

As used herein, the term "copolymer" refers to a polymer containing two kinds of monomers such as propylene and ethylene or propylene and 1-hexene.

In some embodiment, the copolymer of propylene and ethylene component B) contains up to 0.6 wt % of 1-hexene derived units, based upon the total weight of the copolymer of propylene and ethylene.

The composition of the present disclosure is endowed with high melt strength and therefore the polypropylene composition of the present disclosure is readily processable and have good flow properties in the molten state while retaining good mechanical properties, in particular high rigidity, high stress at yield high creep resistance and high heat distortion resistance.

As used herein, the Melt Strength value refers to a measure of the applied linear force to break a polymer melt.

The composition of the present disclosure is endowed with a very broad molecular distribution of molecular weight Mw/Mn. Thanks to broad molecular distribution of molecular weight, the processability of the polypropylene composition of the present disclosure is considerably improved.

In some embodiments, the polypropylene composition of the present disclosure is produced by sequential polymerization in at least two stages, with each subsequent polymerization stage being conducted in the presence of the polymeric material formed in the immediately preceding polymerization reaction. In some embodiments, the component (A) is prepared in at least one first polymerization stage. In some embodiments, the component (B) is prepared in at least one second polymerization stage.

Component A) is produced in a polymerization process carried out in at least two interconnected polymerization zones. In some embodiments, the polymerization process is as described in European Patent No. EP 782587 and Patent Cooperation Treaty Publication No. WO00/02929. The process is carried out in a first and in a second interconnected polymerization zone to which propylene and ethylene or propylene and alpha-olefins are fed in the presence of a catalyst system and from which the polymer produced is discharged. The growing polymer particles flow through the first of the polymerization zones (riser) under fast fluidization conditions, leave the first polymerization zone and enter the second of the polymerization zones (downcomer) through which the polymer particles flow in a densified form under the action of gravity, leave the second polymerization zone and are reintroduced into the first polymerization zone, thereby establishing a circulation of polymer between the two polymerization zones. In some embodiments, the conditions of fast fluidization in the first polymerization zone are established by feeding the monomers gas mixture below the point of reintroduction of the growing polymer into the first polymerization zone. In some embodiments, the velocity of the transport gas into the first polymerization zone is higher than the transport velocity under the operating conditions and between 2 and 15 m/s. In the second polymerization zone, where the polymer flows in densified form under the action of gravity, high values of density of the solid are reached which approach the bulk density of the polymer. In some embodiments, a positive gain in pressure is thereby obtained along the direction of flow, thereby permitting the reintroduction of the polymer into the first reaction zone without the help of mechanical devices. In this way, a "loop" circulation is set up, which is defined by the balance of pressures between the two polymerization zones and by the head loss introduced into the system. In some embodiments, one or more inert gases, such as nitrogen or an aliphatic hydrocarbon, are maintained in the polymerization zones, in quantities such that the sum of the partial pressures of the inert gases is between 5 and 80% of the total pressure of the gases. In some embodiments, the operating temperature is between 50° C. and 120° C., alternatively from 70° C. to 90° C. In some embodiments, the process is carried out under operating pressure of between 0.5 and 10 MPa, alternatively between 1.5 and 6 MPa.

In some embodiments, the various catalyst components are fed to the first polymerization zone, at any point of the first polymerization zone. In some embodiments, the various catalyst components are fed at any point of the second polymerization zone.

In some embodiments, the gas and/or liquid mixture present in the raiser is prevented totally or partially from entering the downcomer. In some embodiments, a gas and/or liquid mixture having a composition different from the gas mixture present in the raiser is introduced into the downcomer. In some embodiments, the gas and/or liquid mixture having a composition different from the gas mixture present in the raiser, which gas and/or liquid mixture is introduced into the downcomer through one or more introduction lines, prevents the latter gas mixture from entering the downcomer. In some embodiments, the gas and/or liquid mixture of different composition is fed to the downcomer in partially or totally liquefied form. In some embodiments, the molecular weight distribution, and thus the P.I. value of the growing polymers, is tailored by carrying out the polymerization process in a reactor diagrammatically represented in FIG. 4 of the Patent Cooperation Publication No. WO00/02929 and by independently metering the comonomer(s) and molecular weight regulators in different proportion into at least one polymerization zone. In some embodiments, the molecular weight regulator is hydrogen. In some embodiments, the polymerization zone is the raiser.

In some embodiments, component B) is prepared in the second stage. In some embodiments, the propylene/ethylene copolymer (B) is produced in a fluidized-bed gas-phase reactor in the presence of the polymeric material and the catalyst system coming from the preceding polymerization step.

In some embodiments, each polymerization stage is carried out in presence of a highly stereospecific heterogeneous Ziegler-Natta catalyst. In some embodiments, the Ziegler-Natta catalysts are made from or containing a solid catalyst component made from or containing a titanium compound having a titanium-halogen bond and an electron-donor compound (internal donor), both supported on magnesium chloride. In some embodiments, the Ziegler-Natta catalysts systems are further made from or containing an organoaluminum compound as a co-catalyst and optionally an external electron-donor compound.

In some embodiments, the catalysts systems are as described in the European Patent Nos. EP45977, EP361494, EP728769, and EP 1272533 and Patent Cooperation Treaty Publication No. W000163261.

In some embodiments, the polypropylene composition is obtained by polymerizing propylene and ethylene in various stages in the presence of a catalyst system made from or containing the product obtained by contacting the following components:

a) a solid catalyst component made from or containing a magnesium halide, a titanium compound having a Ti-halogen bond and an electron donor compound selected from succinates, b) an aluminum hydrocarbyl compound, and c) optionally, an external electron donor compound.

In some embodiments and in the solid catalyst component (a), the succinate is selected from succinates of formula (I)

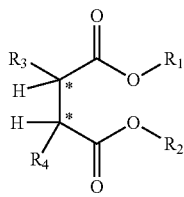

(I)

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, $C_3$-$C_{20}$ cycloalkyl, $C_5$-$C_{20}$ aryl, arylalkyl or alkylaryl group with the proviso that at least one of the radicals $R_3$ and $R_4$ is a branched alkyl; the compounds being, with respect to the two asymmetric carbon atoms identified in the structure of formula (I), stereoisomers of the type (S,R) or (R,S).

In some embodiments, $R_1$ and $R_2$ are selected from the group consisting of $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiment, $R_1$ and $R_2$ groups are selected from the group consisting of methyl, ethyl, n-propyl, n-butyl, isobutyl, neopentyl, and 2-ethylhexyl. In some embodiment, $R_1$ and $R_2$ groups are selected from the group consisting of ethyl, isobutyl, and neopentyl.

In some embodiments, the $R_3$ and/or $R_4$ radicals are secondary alkyls like isopropyl, sec-butyl, 2-pentyl, 3-pentyl or cycloakyls like cyclohexyl, cyclopentyl, cyclohexylmethyl.

In some embodiments, the compounds are selected from the (S,R) (S,R) forms pure or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropyl succinate, diisobutyl 2,3-diisopropyl succinate, diethyl 2,3-bis(cyclohexylmethyl)succinate, diethyl 2,3-diisobutyl succinate, diethyl 2,3-dineopentyl succinate, diethyl 2,3-dicyclopentyl succinate, and diethyl 2,3-dicyclohexylsuccinate.

In some embodiments, the magnesium halide is $MgCl_2$ in active form. In some embodiments, the magnesium halide is as described in U.S. Pat. Nos. 4,298,718 and 4,495,338. In some embodiments, the magnesium halide is selected from magnesium dihalides in active form and used as a support or co-support in components of catalysts for the polymerization of olefins.

In some embodiments, the titanium compounds are selected from the group consisting of $TiCl_4$ and $TiCl_3$. In some embodiments, the titanium compounds are Ti-haloalcoholates of formula $Ti(OR)_{n-y}X_y$, where n is the valence of titanium, y is a number between 1 and n−1, X is halogen, and R is a hydrocarbon radical having from 1 to 10 carbon atoms.

In some embodiments, the catalyst component (a) has an average particle size ranging from 15 to 80 μm, alternatively from 20 to 70 μm, alternatively from 25 to 65 μm.

In some embodiments, the alkyl-Al compound (b) is selected from the group consisting of trialkyl aluminum compounds. In some embodiments, the trialkyl aluminum compounds are selected from the group consisting of triethylaluminum, tri-n-hexylaluminum, and tri-n-octylaluminum. In some embodiments, trialkylaluminums are used in mixtures with alkylaluminum halides, alkylaluminum hydrides or alkylaluminum sesquichlorides. In some embodiments, the alkylaluminum sesquichloride is selected from the group consisting of $AlEt_2Cl$ and $Al_2Et_3Cl_3$.

In some embodiments, the external electron-donor compounds include silicon compounds, ethers, esters, amines, heterocyclic compounds, ketones and 1,3-diethers. In some embodiments, the external electron-donor compound is selected from the group consisting of ethyl 4-ethoxybenzoate and 2,2,6,6-tetramethyl piperidine. In some embodiments, the external donor compounds are silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the external donor compounds are selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,trifluoropropyl-2-ethylpiperidinyl-dimethoxysilane, and 1,1,1,trifluoropropyl-metil-dimethoxysilane. In some embodiments, the external electron donor compound is used in such an amount to give a molar ratio between the organo-aluminum compound and the electron donor compound of from 5 to 500, alternatively from 5 to 400, alternatively from 10 to 200.

In some embodiments, the catalyst forming components are contacted with a liquid inert hydrocarbon solvent at a temperature below about 60° C., alternatively from about 0 to 30° C., for from about 6 seconds to 60 minutes. In some embodiments, the liquid inert hydrocarbon solvent is propane, n-hexane, or n-heptane.

In some embodiments, the catalyst components (a), (b) and optionally (c) are fed to a pre-contacting vessel, in amounts such that the weight ratio (b)/(a) is in the range of 0.1-10. In some embodiments, the compound (c) is present and the weight ratio (b)/(c) corresponds to the molar ratio defined above. In some embodiments, the components are pre-contacted at a temperature of from 10 to 20° C. for 1-30 minutes. In some embodiments, the precontact vessel is a stirred tank reactor.

In some embodiments, the precontacted catalyst is then fed to a prepolymerization reactor where a prepolymerization step takes place. In some embodiments, the prepolymerization step is carried out in a first reactor selected from a loop reactor or a continuously stirred tank reactor. In some embodiments, the prepolymerization step is carried out in liquid-phase. The liquid medium is made from or containing liquid alpha-olefin monomer(s), optionally with the addition of an inert hydrocarbon solvent. In some embodiments, the hydrocarbon solvent is aromatic or aliphatic. In some embodiments, the aromatic hydrocarbon solvent is toluene. In some embodiments, the aliphatic hydrocarbon solvent is selected from the group consisting of propane, hexane, heptane, isobutane, cyclohexane and 2,2,4-trimethylpentane. In some embodiments, the amount of hydrocarbon solvent is lower than 40% by weight with respect to the total amount of alpha-olefins, alternatively lower than 20% by weight. In some embodiments, step (a) is carried out in the absence of inert hydrocarbon solvents.

In some embodiments, the average residence time in this reactor ranges from 2 to 40 minutes, alternatively from 10 to 25 minutes. In some embodiments, the temperature ranges between 10° C. and 50° C., alternatively between 15° C. and 35° C. In some embodiments, the resulting pre-polymerization degree was in the range from 60 to 800 g per gram of solid catalyst component, alternatively from 150 to 500 g per gram of solid catalyst component. In some embodiments, step (a) is further characterized by a low concentration of solid in the slurry. In some embodiments, the concentration of solid in the slurry is in the range from 50 g to 300 g of solid per liter of slurry.

In some embodiments, the polypropylene composition of the present disclosure is used for the manufacturing of foamed articles, such as laminated and un-laminated sheet, beads, and profiles. In some embodiments, foams having densities in the range from 30 to 700 Kg/m$^3$, alternatively from 100 to 600 Kg/m$^3$, are obtained from the polypropylene composition. In some embodiments, the foams are used for thermal and electrical insulation, noise and vibration damping, shock absorption, and weight reduction.

In some embodiments, the foams are used in the automotive field for bumper interiors and impact panels, in marine field as floating devices or in electrical cables insulation. In some embodiments, the polypropylene composition is extruded in the presence of a foaming agent in single-screw or twin-screw extruders, both in single and multilayer constructions.

In some embodiments, the foaming agents are physical foaming agents or chemical foaming agents. In some embodiments, the physical foaming agents are selected from the group consisting of $CO_2$, gaseous hydrocarbons, $H_2O$, CFCs, and mixtures thereof. In some embodiments, the chemical foaming agents are selected from the group consisting of inorganic carbonates, citric acid, and mixtures thereof. In some embodiments, the polypropylene composition is firstly pelletized and foamed and subsequently molded for the manufacturing of foamed polypropylene beads. In some embodiments, foamed articles such as foamed coated or uncoated pipes and foamed packaging for foods are manufactured using the polypropylene composition of the present disclosure.

The following examples are given to illustrate and not to limit the present disclosure.

EXAMPLES

The data of the propylene polymer materials were obtained according to the following methods:

Melt Flow Rate

Determined according to ISO 1133 (230° C., 2.16 kg).

Polydispersity Index (P.I.)

Molten homopolymer was submitted to a dynamic test in rate sweep with a parallel plate rheometer, at temperature of 200° C., according to the ISO 6721-10. G' (storage modulus) and G" (loss modulus) were measured as function of frequency. From the rate sweep data, PI is defined by PI=105/Gc, wherein Gc is the crossover modulus as value of modulus at G'=G".

Hexene Content (C6 Content)

Determination of 1-Hexene Content by NMR $^{13}$C NMR spectra were acquired on an AV-600 spectrometer equipped with cryoprobe, operating at 150.91 MHz in the Fourier transform mode at 120° C. The peak of the propylene CH was used as internal reference at 28.83. The 13C NMR spectrum was acquired using the following parameters:

| | |
|---|---|
| Spectral width (SW) | 60 ppm |
| Spectrum center (O1) | 30 ppm |
| Decoupling sequence | WALTZ 65_64pl |
| Pulse program | ZGPG |
| Pulse Length (P1) | for 90° |
| Total number of points (TD) | 32K |
| Relaxation Delay | 15 s |
| Number of transients | 512 |

The total amount of 1-hexene as molar percent was calculated from identified diad present in the measured NMR using the following relations:

$[P]=PP+0.5PH$ $[H]=HH+0.5PH$

Assignments of the $^{13}$C NMR spectrum of propylene/1-hexene copolymers were calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Determination of Ethylene (C2) Content by NMR $^{13}$C NMR of Propylene/Ethylene Copolymers $^{13}$C NMR spectra were acquired on a Bruker AV-600 spectrometer equipped with cryoprobe, operating at 160.91 MHz in the Fourier transform mode at 120° C. The ethylene (C2) content was measured on the total composition. The ethylene content of component B) was calculated by using the amount of component B) and component A) according to the following equation:

$C_{2tot}=C_{2B} \times$ wt % compB/100.

The samples were dissolved in 1,1,2,2-tetrachloroethane-d2 at 120° C. with an 8% wt/v concentration. Each spectrum was acquired with a 90° pulse, 15 seconds of delay between pulses and CPD to remove $^1H-^{13}C$ coupling. 512 transients were stored in 32K data points using a spectral window of 9000 Hz.

Diad distribution is calculated according to the following relations:

$PP=100I_1/\Sigma$ $PH=100I_2/\Sigma$ $HH=100I_3/\Sigma$ $$PE=100I_4/\Sigma$$

$$HE=100I_6/\Sigma$$

$$EE=100(0.5(I_{13}+I_{16})+0.25I_{12})/\Sigma$$

Where $\Sigma=I_1+I_2+I_3+I_4+I_6+0.5(I_{13}+I_{16})+0.25\,I_{12}$

The total amount of 1-hexene and ethylene as molar percent was calculated from diad using the following relations:

$$[P]=PP+0.5PH+0.5PE$$

$$[H]=HH+0.5PH+0.5HE$$

$$[E]=EE+0.5PE+0.5HE$$

Assignments of the $^{13}$C NMR spectrum of propylene, 1-hexene and ethylene

| Area | Chemical Shift | Assignments | Sequence |
|---|---|---|---|
| 1 | 46.93-46.00 | $S_{\alpha\alpha}$ | PP |
| 2 | 44.17-43.82 | $S_{\alpha\alpha}$ | PH |
| 3 | 41.30 | $S_{\alpha\alpha}$ | HH |
| 4 | 38.00-37.40 | $S_{\alpha\gamma}+S_{\alpha\delta}$ | PE |
| 5 | 35.70 | $4B_4$ | H |
| 6 | 35.00-34.53 | $S_{\alpha\gamma}+S_{\alpha\delta}$ | HE |
| 7 | 33.75 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.36 | $2B_4$ | H |
| 18 | 21.80-19.90 | $CH_3$ | P |
| 19 | 14.22 | $CH_3$ | H |

The molar percentage of ethylene content was evaluated using the following equation:

$$E\%\,mol=100*[PEP+PEE+EEE].$$

The weight percentage of ethylene content was evaluated using the following equation:

$$E\%\,wt.=\frac{100*E\%\,mol*MW_E}{E\%\,mol*MW_E+P\%\,mol*MW_P}$$

where P % mol is the molar percentage of propylene content, while $MW_E$ and $MW_P$ were the molecular weights of ethylene and propylene, respectively.

Molar Ratios of the Feed Gases
  Determined by gas-chromatography.
Samples for the Mechanical Analysis
  Samples were obtained according to ISO 294-2
Flexural Modulus
  Determined according to ISO 178.
Melt Strength
  Measured according to ISO 16790, the melt strength was the measure of the drawing and break characteristics of plastics through the measurement of the force (in newton) generated in deforming a molten filament under defined extrusion temperature and drawing conditions.

Melting Temperature, Melting Enthalpy and Crystallization Temperature
  Determined according to ISO 11357-3, at scanning rate of 20 C/min both in cooling and heating, on a sample of weight between 5 and 7 mg. under inert N2 flow. Instrument calibration made with Indium.
Xylene Soluble and Insoluble Fractions at 25° C. (Room Temperature)
  Xylene Solubles according to ISO 16 152; with solution volume of 250 ml, precipitation at 25° C. for 20 minutes, 10 of which with the solution in agitation (magnetic stirrer) and drying at 70° C. under vacuum.
Intrinsic Viscosity (I.V.)
  The sample was dissolved by tetrahydronaphthalene at 135° C. and then poured into the capillary viscometer.
  The viscometer tube (Ubbelohde type) was surrounded by a cylindrical glass jacket. The setup allowed temperature control with a circulating thermostatic liquid.
  The downward passage of the meniscus was timed by a photoelectric device. The passage of the meniscus in front of the upper lamp started the counter which had a quartz crystal oscillator. The counter stopped as the meniscus passed the lower lamp. The efflux time was registered and converted into a value of intrinsic viscosity.
IZOD Impact Strength
  Determined according to ISO 180/1A Example 1

Preparation of the Solid Catalyst Component
  The Ziegler-Natta catalyst was prepared according to Example 5, lines 48-55 of the European Patent No. EP728769. Triethylaluminum (TEAL) was used as co-catalyst, and dicyclopentyldimethoxysilane was used as an external donor.
Polymerization
  The polymerization was carried out in continuous mode in a series of two reactors equipped with devices to transfer the product from the first reactor to the second reactor. The first reactor was a polymerization apparatus as described in Patent Cooperation Treaty Publication No. WO00/02929.
  The catalyst was sent to the polymerization apparatus including two interconnected cylindrical reactors, a riser and a downcomer. Fast fluidization conditions were established in the riser by recycling gas from the gas-solid separator and a barrier effect was activated. The resulting product was feed to a fluid bed gas phase reactor. Hydrogen was used as molecular weight regulator.
  Component (A) was prepared in the first reactor, while component (B) was prepared in the second reactor.
  Hydrogen was used as molecular weight regulator.
  The gas phase (propylene, ethylene, 1-hexene and hydrogen) was continuously analyzed via gas-chromatography.
  At the end of the polymerization process, the powder was discharged and dried under a nitrogen flow.
  The main polymerization conditions are reported in Table1.

TABLE 1

| Example | | 1 | 2 | Comp 3 |
|---|---|---|---|---|
| Component A) (reactor MZCR) | | | | |
| TEAL/external donor | wt/wt | 10 | 10 | 11 |
| TEAL/catalyst | wt/wt | 5 | 5 | 4 |

TABLE 1-continued

| Example | | 1 | 2 | Comp 3 |
|---|---|---|---|---|
| Temperature | ° C. | 80 | 80 | 80 |
| Pressure | bar-g | 24 | 24 | 24 |
| Split holdup riser | wt % | 65 | 60 | 64 |
| downcomer | wt % | 35 | 40 | 36 |
| $C_3^-$ riser | mole % | 82.9 | 86.8 | 87.1 |
| $C_6^-$ riser | mole % | 1.27 | 1.28 | 0.88 |
| $H_2/C_3^-$ riser | mol/mol | 0.07 | 0.072 | 0.035 |
| $C_6^-/(C_6^- + C_3^-)$ riser | mol/mol | 0.016 | 0.015 | 0.01 |
| $C_3^-$ downcomer | mole % | 85 | 90 | 90 |
| $C_6^-$ downcomer | mole % | 2.0 | 2.0 | 2.0 |
| $H_2/C_3^-$ downcomer | mol/mol | 0.0001 | 0.0001 | 0.0001 |
| $C_6^-/(C_6^- + C_3^-)$ downcomer | mol/mol | 0.023 | 0.022 | 0.015 |
| Component B (gas phase reactor) | | | | |
| Temperature | ° C. | 80 | 80 | — |
| Pressure | MPa | 20 | 20 | — |
| $C_2^-/C_2^- + C_3^-$ | mol/mol | 0.49 | 0.49 | — |
| $H_2/C_2^-$ | mol/mol | 0.011 | 0.0065 | — |

$C_2^-$ = ethylene
$C_3^-$ = propylene $C_3^-$ 1-hexene

The polymers features are reported in Table 2.

TABLE 2

| Example | | Ex1 | Ex 2 | Comp ex 3 |
|---|---|---|---|---|
| Component a) | | | | |
| Copolymer content | wt % | 79 | 81 | — |
| 1-hexene content | wt % | 1.6 | 1.6 | 1.2 |
| MFR | g/10' | 5 | 5 | 5 |
| Xylene soluble at 25° C. | wt % | 4.9 | 4.9 | 4.9 |
| Polydisperity (P.I.) | | 12.9 | 12.9 | 12.9 |
| Component b) | | | | |
| Copolymer content | wt % | 21 | 19 | — |
| Ethylene content in component b) | wt % | 57.3 | 51.2 | — |
| Property of the composition | | | | |
| Xylene soluble at 25° C. | wt % | 19.8 | 16.2 | — |
| MFR | g/10' | 1.6 | 2.0 | — |
| XSIV (intrinsic viscosity of XS) | dl/g | 4.41 | 5.96 | — |
| Ethylene content on the xylene soluble fraction | Wt % | 47.8 | 45.5 | — |
| Flexural Modulus | MPa | 930 | 1020 | 1380 |
| Izod impact at 23° C. | KJ/m² | 15.6 | 9.5 | 3.7 |
| Izod impact at 0° C. | KJ/m² | 7 | 5.1 | 3.7 |
| Izod impact at −20° C. | KJ/m² | 5.3 | 3.7 | — |
| charpy impact at 23° C. | KJ/m² | 14.4 | 8.7 | 4.3 |
| charpy impact at 0° C. | KJ/m² | 6.6 | 4.3 | 1.4 |
| charpy impact at −20° C. | KJ/m² | 5.3 | 4.2 | 1.4 |
| Elongation @ break | % | 500 | 440 | 440 |
| Melting temperature | ° C. | 148.5 | 147.8 | 151.6 |
| Melt strength 230° C. | | 6 | 6 | 4 |
| Mw/Mn | | 30.8 | 33.2 | 23.6 |

The compositions of examples 1, 2 and comparative example 3 were blended with an additive package.

Foaming

Foils were produced PM chill roll foil line with an extruder configuration of Ø30 mm, L/D 25:1 and flat die of width 350 mm and gap opening of 1 mm. The chemical blowing agent (CBAs) used was HYDROCEROL® CT 660 (commercially available from Clariant) at 2% loading. The foils were produced using bell-shaped temperature profiles, adjusted individually for each sample.

Thermoforming Process

Thermoforming was performed in the Formech TF686 vacuum former using a Ø250 mm deep tray (h80 mm) positive bowl. Sheets were heated to 215° C. (pyrometer) using a mold temperature of 60° C.

The results of the foamed thermoformed examples are reported in Table 3.

TABLE 3

| 2% Hydrocerol CT660 | Melt strength | Final density (g/ml) | Rating processual/ visual (1 is the highest rank) | forming properties | appearance (mold @60° C.) |
|---|---|---|---|---|---|
| Comp ex 3 | 4 | 0.55 | 4 | some webbing | good |
| Ex 2 | 6 | 0.60 | 1 | easy | good |
| Ex 1 | 6 | 0.58 | 2 | easy | good |

What is claimed is:

1. A polypropylene composition comprising:
A) from 70 wt % to 90 wt % of a propylene 1-hexene copolymer containing from 0.5 wt % to 3.5 wt % of 1-hexene derived units, based upon the total weight of the propylene 1-hexene copolymer, having:
   fraction soluble in xylene at 25° C. between 2.5 wt % and 8.0 wt %, based upon the total weight of the propylene 1-hexene copolymer;
   melt flow rate (MFR L ISO 1133, condition L, that is, 230° C. and 2.16 kg load) ranging from 2.0 to 15.0 g/10 min; and
   a polydispersity index (PI) between 9.2 and 21.3; and
B) from 10 wt % to 30 wt %, of a copolymer of propylene and ethylene containing from 45.0 wt % to 65.0 wt %, of ethylene derived units, based upon the total weight of the copolymer of propylene and ethylene;
wherein, in the polypropylene composition,
   the xylene soluble fraction at 25° C. ranges from 10.0 wt % to 25.0 wt %, based upon the total weight of the polypropylene composition;
   the intrinsic viscosity of the fraction soluble in xylene at 25° C. ranges from 4.0 dl/g to 6.5 dl/g;
   the content of ethylene derived units in the fraction soluble in xylene at 25° C. is lower than the content of ethylene derived units of component B) and ranges from 38.0 wt % to 55.0 wt %, based upon the total weight of the polypropylene composition, and the distribution of molecular weight Mw/Mn ranges from 25 to 40;

the sum of component A) and B) being 100.

2. The polypropylene composition according to claim 1, wherein component (A) ranges from 74 wt % to 86 wt % and component B) ranges from 14 wt % to 26 wt %.

3. The polypropylene composition according to claim 1, wherein, in component A), the propylene 1-hexene copolymer contains from 1.0 wt % to 2.9 wt % of 1-hexene derived units.

4. The polypropylene composition according to claim 1, wherein component A) has a polydispersity index (PI) between 10.1 and 16.4.

5. The polypropylene composition according to claim 1, wherein component A) has the fraction soluble in xylene at 25° C. between 3.1 wt % and 6.8 wt %.

6. The polypropylene composition according to claim 1, wherein the copolymer of propylene and ethylene of component B) contains from 48.0 wt % to 61.0 wt % of ethylene derived units.

7. The polypropylene composition according to claim 1, wherein the xylene soluble fraction at 25° C. ranges from 16.0 wt % to 22.0 wt %.

8. The polypropylene composition according to claim 1, wherein the intrinsic viscosity of the fraction soluble in xylene at 25° C. ranges from 4.1 dl/g to 6.3 dl/g.

9. The polypropylene composition according to claim 1, wherein the content of ethylene derived units in the fraction soluble in xylene at 25° C. ranges from 41.0 wt % to 52.0 wt %.

10. The polypropylene composition according to claim 1, wherein the distribution of molecular weight Mw/Mn ranges from 28 to 38.

11. The polypropylene composition according to claim 1, wherein the content of ethylene derived units in the fraction soluble in xylene at 25° C. ranges from 43.0 wt % to 51.0 wt %.

12. The polypropylene composition according to claim 1, wherein the distribution of molecular weight Mw/Mn ranges from 30 to 35.

13. The polypropylene composition according to claim 1, wherein the intrinsic viscosity of the fraction soluble in xylene at 25° C. ranges from 5.3 dl/g to 6.2 dl/g.

14. The polypropylene composition according to claim 1, wherein the copolymer of propylene and ethylene of component B) contains from 50.0 wt % to 59.0 wt %; of ethylene derived units.

15. Foamed articles comprising the polypropylene composition according to claim 1.

* * * * *